US012800097B2

(12) United States Patent
Robbins et al.

(10) Patent No.: US 12,800,097 B2
(45) Date of Patent: Nov. 17, 2026

(54) MAGNETIC HANGING SYSTEM

(71) Applicants: Dean Robbins, Roseville, CA (US); Darrin Robbins, Griffith, IN (US)

(72) Inventors: Dean Robbins, Roseville, CA (US); Darrin Robbins, Griffith, IN (US)

( * ) Notice: Subject to any disclaimer, the term of this patent is extended or adjusted under 35 U.S.C. 154(b) by 71 days.

(21) Appl. No.: 19/059,966

(22) Filed: Feb. 21, 2025

(65) Prior Publication Data

US 2025/0271100 A1 Aug. 28, 2025

Related U.S. Application Data

(60) Provisional application No. 63/564,468, filed on Mar. 12, 2024, provisional application No. 63/557,494, filed on Feb. 24, 2024.

(51) Int. Cl.

| | |
|---|---|
| ***F16M 13/02*** | (2006.01) |
| ***F16B 1/00*** | (2006.01) |
| ***G09F 7/04*** | (2006.01) |
| ***G09F 17/00*** | (2006.01) |

(52) U.S. Cl.

CPC ............ *F16M 13/022* (2013.01); *F16B 1/00* (2013.01); *G09F 7/04* (2013.01); *G09F 17/00* (2013.01); *F16B 2200/83* (2023.08)

(58) Field of Classification Search

CPC ..... F16M 13/022; F16B 1/00; F16B 2200/83; G09F 7/04; G09F 17/00

See application file for complete search history.

(56) References Cited

U.S. PATENT DOCUMENTS 3,109,619 A * 11/1963 Krug ........................ A47K 1/09 248/690
3,245,165 A * 4/1966 Podoloff ............... F16B 5/0258 248/467
3,727,658 A * 4/1973 Eldridge, Jr. ......... H01F 7/0215 206/370
3,750,890 A * 8/1973 Smith .................... A47G 29/08 248/309.2
4,250,596 A * 2/1981 Hara ................... B29C 65/4815 52/309.3
4,380,292 A * 4/1983 Cramer ............... A61M 5/3205 206/370
4,422,137 A * 12/1983 Watts ...................... F21V 21/02 362/147
4,785,562 A * 11/1988 Good ........................ G09F 1/12 40/711

(Continued)

*Primary Examiner* — Stanton L Krycinski

(57) ABSTRACT

A magnetic hanging system is disclosed herein. The magnetic hanging system includes a plurality of retainers and one or more plurality of retaining plates. The retaining plates are ferromagnetic, and the retainers include an attachment surface that attracts and secures the retaining plate (or another ferromagnetic surface) to the retainer. A retainer may comprise a retaining base and a retaining top. The magnetic base includes the base attachment surface that includes a base magnet that attracts and secures the retainer to a ferromagnetic surface. The retaining base also includes a base securing feature. The retaining top includes the top and a top securing feature. portion. The retainer is configured for securing at least a portion of the article by connecting the top securing feature to the bottom securing feature through a securing hole in the to-be-hung article.

17 Claims, 8 Drawing Sheets

(56) References Cited

U.S. PATENT DOCUMENTS

| | | | | |
|---|---|---|---|---|
| 4,875,654 | A * | 10/1989 | Chandonnet | A47G 1/17 248/467 |
| 5,334,151 | A * | 8/1994 | Santilli | A61M 5/3213 206/365 |
| 5,623,801 | A * | 4/1997 | Drumbl | E04F 19/08 52/220.8 |
| 5,639,138 | A * | 6/1997 | Smith | G09F 17/00 211/DIG. 1 |
| 5,695,165 | A * | 12/1997 | Moriarty | B01L 9/54 248/206.5 |
| 5,743,394 | A * | 4/1998 | Martin | B25H 3/003 211/DIG. 1 |
| 5,855,285 | A * | 1/1999 | Laird | B25H 3/003 206/378 |
| 5,918,397 | A * | 7/1999 | Elmer | G09F 21/04 40/592 |
| 6,305,656 | B1 * | 10/2001 | Wemyss | B60R 11/0241 220/628 |
| 6,405,983 | B1 * | 6/2002 | Goj | A47G 1/17 248/205.5 |
| 6,564,434 | B1 * | 5/2003 | Morita | A45C 13/1069 24/114.2 |
| 6,866,237 | B2 * | 3/2005 | Dagan | A47G 1/14 40/661.01 |
| 6,895,642 | B2 * | 5/2005 | Huang | A47G 1/17 248/205.5 |
| 7,097,144 | B2 * | 8/2006 | Kohno | A47G 25/0607 248/683 |
| 7,209,021 | B2 * | 4/2007 | Clement | A47G 1/17 335/302 |
| 7,744,051 | B2 * | 6/2010 | Joyce | A47F 5/0807 248/467 |
| 8,146,279 | B2 * | 4/2012 | Elmer | G09F 21/04 40/592 |
| 8,490,936 | B2 * | 7/2013 | Rinck | F16B 45/00 362/396 |
| 8,662,464 | B2 * | 3/2014 | Hand | F16B 47/003 242/379.2 |
| 9,140,279 | B2 * | 9/2015 | Frias | F16B 5/0208 |
| 9,153,152 | B1 * | 10/2015 | Elmer | H01F 7/0221 |
| 9,284,973 | B2 * | 3/2016 | Hoffman | F16B 35/04 |
| 9,368,050 | B2 * | 6/2016 | Bigham | G09F 17/00 |
| 9,388,934 | B1 * | 7/2016 | Kilgore | F16M 11/2064 |
| 9,561,456 | B2 * | 2/2017 | Simmons | B01D 46/0005 |
| 9,611,407 | B1 * | 4/2017 | Heuer | C09J 7/29 |
| 9,622,601 | B2 * | 4/2017 | Krake | A47G 1/17 |
| 9,852,664 | B2 * | 12/2017 | Latifzada | G09F 3/08 |
| 10,147,342 | B2 * | 12/2018 | Gogatz | G09F 17/00 |
| 10,304,429 | B1 * | 5/2019 | Broadbelt | F16M 11/041 |
| 10,309,433 | B2 * | 6/2019 | Salvatore | A45C 13/08 |
| 10,342,266 | B2 * | 7/2019 | Oh | A41B 9/023 |
| 10,405,676 | B1 * | 9/2019 | Underwood | A47F 5/06 |
| 10,595,659 | B2 * | 3/2020 | Milkowski | A47G 33/10 |
| 10,609,967 | B2 * | 4/2020 | Reiter | A41D 1/005 |
| 10,843,328 | B2 * | 11/2020 | Wacker | F16B 1/00 |
| 10,898,013 | B2 * | 1/2021 | Kempner | A45C 11/16 |
| 11,172,717 | B2 * | 11/2021 | Reiter | A44B 17/0088 |
| 11,286,323 | B2 * | 3/2022 | Ikebata | C08F 220/1808 |
| 11,398,169 | B2 * | 7/2022 | Huseman | G09F 21/041 |
| 11,555,600 | B2 | 1/2023 | Robbins | |
| 11,707,145 | B2 * | 7/2023 | Johnson | A47K 3/281 211/30 |
| 11,994,252 | B2 * | 5/2024 | Frost | F16M 11/041 |
| 12,232,613 | B1 * | 2/2025 | Kinsella | A47B 81/005 |
| 12,355,133 | B2 * | 7/2025 | Anderson | H01Q 1/27 |
| 12,551,632 | B2 * | 2/2026 | Orr | A61M 5/002 |
| 2002/0130231 | A1 * | 9/2002 | Winnard | B25H 3/04 248/206.5 |
| 2007/0120392 | A1 * | 5/2007 | Wolfinger | F16B 45/00 296/100.17 |
| 2008/0014043 | A1 * | 1/2008 | Zasloff | F16B 13/063 248/220.31 |
| 2009/0090828 | A1 * | 4/2009 | Junkins | F16B 45/00 248/220.21 |
| 2009/0194650 | A1 * | 8/2009 | Corvo | A47G 1/02 248/205.3 |
| 2009/0211123 | A1 * | 8/2009 | Arnold | B43L 1/00 40/1 |
| 2010/0276382 | A1 * | 11/2010 | Antonioni | A47F 5/0807 211/59.2 |
| 2013/0105642 | A1 * | 5/2013 | Marq | H01F 7/0252 29/525.03 |
| 2014/0374554 | A1 * | 12/2014 | Jordan | F16M 13/022 248/206.5 |
| 2016/0016306 | A1 * | 1/2016 | Haddon | B25H 3/04 248/537 |
| 2017/0314290 | A1 * | 11/2017 | Perry | E04H 15/001 |
| 2018/0056888 | A1 * | 3/2018 | Wang | B60R 11/0241 |
| 2018/0185970 | A1 * | 7/2018 | Simmons | B01D 46/0005 |
| 2018/0338651 | A1 * | 11/2018 | Burtt | A47K 17/00 |
| 2021/0403774 | A1 * | 12/2021 | Ishikawa | C09J 7/385 |
| 2026/0026641 | A1 * | 1/2026 | Welgs | A47F 5/0006 |

* cited by examiner

MAGNETIC HANGING SYSTEM

REFERENCE TO RELATED APPLICATIONS

This application claims priority to U.S. Provisional Patent Application No. 63/557,494, filed Feb. 24, 2024, entitled “Magnetic Hanging System,” which is incorporated herein by reference. This application further claims priority to U.S. Provisional Patent Application No. 63/564,468, filed Mar. 12, 2024, entitled “Magnetic Hanging System,” which is incorporated herein by reference.

BACKGROUND OF THE INVENTION

Hanging or displaying banners or other items (e.g., draperies, flags, posters, artwork, garlands, advertisements, etc., comprehensively referred to as articles) is often problematic. Nails or screws may be and are often used, but of course mounting devices become permanent features of the surface upon which an article is hung or, at least, leave scars/marks on those surfaces. Moreover, these mounting means typically require hand tools to secure screws and nails in place.

Often, when hanging an article, there is a “temporary intent” to the hanging: i.e., the article is to be hung securely but temporarily. Screws and nails tend to be permanent and leave holes and/or scars on the surface and are not desirable for temporary display of an article. Moreover, using these more conventional, permanent means, once an article is hung, attachment points to the mounting surface are not easily repositioned to remove slack from the article, or relocate the article to a better position.

Hanging articles on surfaces or structures other than a wall into which a screw, or nail can be added, is often difficult and often results in an insecure presentation of those articles. Articles hung on a wire or rope, typically using clips, hooks or clothes pins, will shift along the wire laterally with the slightest of wind, or to a low point due to slack in the wire.

The disclosed subject matter presents a magnetic mounting system that can be advantageously utilized over a variety of surfaces and structures, providing both secure and, if desired, temporary hanging of articles, such as banners, flags, posters, pictures or other various items.

DESCRIPTION

According to aspects of the disclosed subject matter, a magnetic hanging system is disclosed. In at least one embodiment, the magnetic hanging system includes a plurality of retainers and a plurality of retaining plates. The retaining plates are ferromagnetic, and the retainers include a base attachment surface that attracts and secures the retaining plate to the retainer.

In various embodiments of the disclosed subject matter, a retainer may comprise a retaining base and a retaining top (also referred to as a “top hat.”) The magnetic base includes the base attachment surface that magnetically attracts and secures the retainer to a ferromagnetic surface, such as a retaining plate. The retaining top includes a shaft portion and a top portion. The retainer is configured such that the retaining top can be secured to and detached from the retaining base. Through this ability to attach and detach, the retaining post (whether it is part of the retaining top or the retaining base) can pass through a securing hole (often, though not exclusively, demarked and reinforced by a grommet) of a to-be-secured article, after which the retaining top and retaining base may be secured together. In various embodiments of the disclosed subject matter, the retaining top and the retaining base are secured together through a mechanical attachment, though in alternative embodiments the retaining post and retaining base may be secured together through a magnetic attachment.

In various additional and/or alternative embodiments of the disclosed subject matter, the magnetic hanging system may comprise one or more mounting discs that may be positioned over edges of thin surfaces, wires, latices, cables, structures, and the like. For example, one or more mounting discs may also be used in conjunction with chain-link fencing to hang an article.

According to aspects of the disclosed subject matter, a mounting disc may include a slot or channel (from one edge of the mounting disc), extending toward the center portion of the disc where a retaining plate opening is found in the surface of the mounting disc, wherein the retaining plate opening is in the shape of the retaining plate. In this embodiment, a retaining plate is inserted through the channel to the retaining plate opening where the retaining plate is exposed. The retaining plate opening in the mounting disc is slightly smaller in dimensions than the retaining plate so that the retaining plate does not fall out of the mounting disc.

In alternative embodiments of the disclosed subject matter, the mounting disc may include an opening or depression, in the shape of a retaining plate, into which a retaining plate is secured (typically though not exclusively through the use of double-sided adhesive.) In yet another embodiment of the disclosed subject matter, the mounting disc includes one or more retaining plates that are molded such that at least one retaining plate is incorporated within the mounting disc.

According to aspects of the disclosed subject matter, at least one surface of each retaining plate includes a small ridge around its outside edge to prevent an attached retainer from sliding off the retaining plate. Advantageously, this prevents the unintentional detachment of the retainer from the retaining plate through a sheering force. Still further, the magnetic hanging system may comprise a plurality of reinforcing tabs, to reinforce securing holes in a to-be-secured article. Reinforcing tabs may include both corner reinforcing tabs particularly configured for reinforcing corner areas of a to-be-secured article, as well as single edge reinforcing tabs that fold over a single edge of the to-be-secured article.

Advantageously, the magnetic hanging system may be deployed both indoors and outdoors, and utilize nearly any surface or structure for mounting and hanging an article. Indeed, the disclosed magnetic hanging system may be mounted on a variety of surfaces including, illustratively, stucco, glass, ceramic, wood, cement/concrete, vinyl (including vinyl siding), Hardie board, aluminum, drywall (including painted and non-painted drywall), fiberglass, plastic, wires, ropes, cables, and more Moreover, in embodiments of the disclosed subject matter, the magnetic hanging system may be used and reused, even in wet conditions.

Further advantageously, use of a retainer and reinforcing tab (with a retaining plate when mounted on a non-ferromagnetic surface) exhibits increased strength without increasing the weight for structures to support the magnetic hanging system. Moreover, the retainer-based retention is almost always non-destructive to the article being hung. Consider, for example, a banner hung on a chain link fence in a windstorm. While the magnetic hanging system will likely overcome commonly encountered winds and breezes (e.g., up to 25 mph), there are winds that will cause the banner to separate from its mounting surface. However, unlike instances of permanent attachment that result in tears in a banner, the worst thing that happens is that the retainer holding the banner in place is separated from its retaining plate (or mounting surface). Because the retainer was detached, and because of the reinforcing tabs that may be used, the banner remains unharmed by its detachment from the mounting surface. The process of reattaching the banner is simply placing the retainers back to their position (irrespective of whether the surface is wet)!

Still further, it should be appreciated that the carbon steel used in the magnetic hanging system (when needed) in the form of retaining plates, and the fact that the retaining plates are very thin and therefore, very light, as well as water resistant (having a powder coating on all exposed surfaces), makes the disclosed magnetic hanging system ideal for nearly all instances of permanent, semi-permanent, and transitory hanging of articles from a mounting surface.

BRIEF DESCRIPTION OF THE FIGURES

Aspects and embodiments of the disclosed subject are described in greater detail with respect to the following figures.

DETAILED DESCRIPTION

Figure 1:
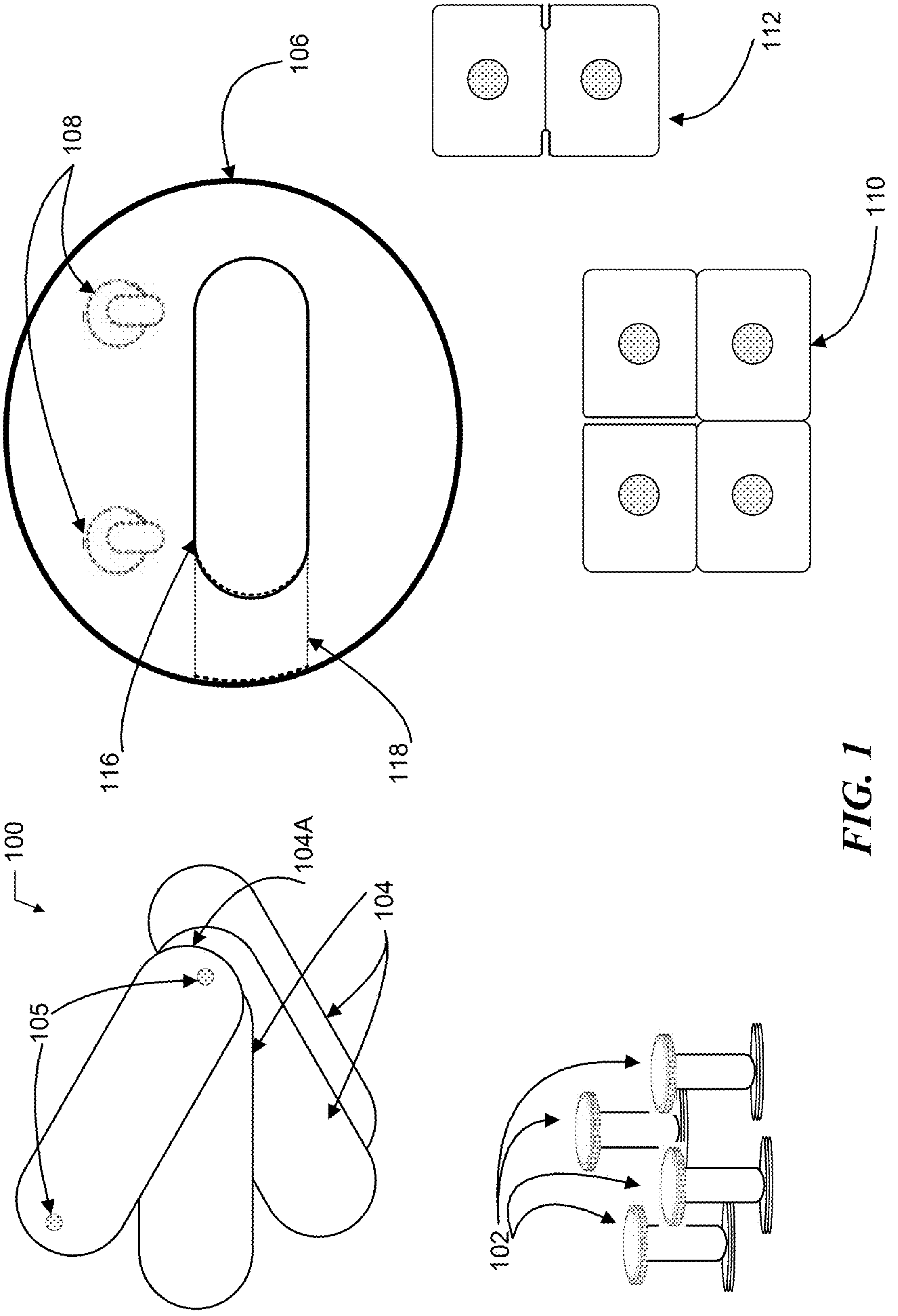
FIG. 1 illustrates various elements of a magnetic hanging system in accordance with aspects of the disclosure subject matter.

Turning to the figures, FIG. 1 illustrates various elements of at least one embodiment of a magnetic hanging system 100, all in accordance with aspects of the disclosure subject matter. In this embodiment, the magnetic hanging system includes one or more retainers 102 and one or more retaining plates 104. Typically, there is at least one retaining plate for each retainer. As will be described in greater detail below, retainers are comprised of a retaining base and retaining top which can be secured together or detached, allowing a retainer to be engaged in/through a securing hole of a to-be-hung article, and to be removed from securing the article when desired.

As indicated above, the one or more retaining plates 104 are comprised of ferromagnetic material, as a carbon steel. The retaining plates 104 of FIG. 1 are shown as being rectangular with rounded ends, but this shape is illustrative and should not be viewed as limiting for retaining plates. Retaining plates that are circular or elliptical, square, etc., even irregularly shaped retaining plates may be used. In an actual implementation, the retaining plates are 60 mm long, 30 mm wide, and 1 mm thick, with a rounded end having a 15 mm radius. Of course, longer and/or wider and/or thicker retaining plates may be used, all dependent on specific needs for hanging an article. To prevent rust, the retaining plates may also have a powder coating applied to all external surfaces. Advantageously, the application of powder coating to all surfaces permits the outdoor use of the retaining plate (without rusting).

While the retaining plates may be attached to a mounting surface or structure via a variety of mechanical means, in various embodiments, an adhesive may be pre-applied to one surface of a retaining plate that enables the retaining plate to be secured (attached) to a mounting surface. Indeed, with the right selection of securing adhesive, such as a VHB (very high bond) adhesive, a retaining plate may be placed on nearly any type of surface. Indeed, in some embodiments, rather than applying an adhesive to a side of the retaining plate, a magnetic hanging system may include adhesive tabs, often though not exclusively in the shape of the retaining plate (though typically having slightly smaller dimensions to accommodate a typical, imperfect application of the adhesive tab to the retaining plate. In actual embodiments, the dimension of an adhesive tab is reduced by 1 mm from each edge of the surface of the retaining on which it is to be applied.

Regarding the VHB adhesive and in accordance with aspects of the disclosed subject matter, the VHB adhesive may comprise a vinyl acrylic foam (VAF) adhesive tape. Moreover, the VAF adhesive tape will have a sufficient thickness that allows the tape to conform to the mounting surface. This, advantageously, makes VAF tape especially suitable for mounting to non-smooth surfaces (e.g., stucco, wall textures, unsanded wood surfaces, etc.) Indeed VAF tape will penetrate into and adhere to the interior walls of cracks or crevasses in a mounting surface. This ability to conform to the mounting surface creates a greater attachment surface area (with respect to a mounting surface) than would be obtained with non-conforming adhesive (e.g., duct tape.)

In actual embodiments, the VAF tape has a thickness of between 1.5 mm and 2.0 mm (though other thicknesses, e.g., 1 mm to 2.5 mm, may be utilized. Advantageously, in an actual embodiment, the VAF adhesive/tape has a tensile strength of over 100 psi, which, in some instances, may actually be stronger than the tensile strength of a mounting surface to which the adhesive is applied. As a further advantage, the foam nature of the VAF adhesive has an elastic nature and is not brittle, which allows for some movement (e.g., the flex of a mounting surface or movement of a retaining plate during wind gusts) without separation or breaking the adhesive and returns to its as-applied form after such stretching from any movement. Additionally, the VAF can be removed from a surface by rolling an edge laterally, similar to most elastic adhesives. Yet another advantage is that the adhesive can withstand years of outdoor use after application.

In some embodiments, the adhesive tabs may be configured as removeable adhesive tabs, such that the adhesive tabs can be later removed from both a mounting surface, as well as removed from a retaining plate. Non-limiting examples of such removable adhesives include 3M's™ Command adhesive tabs and/or Scotch's™ Removable Mounting Squares. Additionally, in some alternative embodiments, in contrast to using adhesive tabs, one or more retaining plates, such as retaining plate 104A, may include mounting holes 105 on either end of the retaining plate to facilitate a more permanent mounting to a mounting surface, such as mounting the retaining plate 104A to a surface using a nail or a screw.

In addition to retainers and retaining plates, a magnetic hanging system may also include one or more mounting discs, such as mounting disc 106. As will be described in greater detail below, a mounting disc 106 is used in circumstances when a retaining plate (with or without an adhesive applied) cannot be reasonably applied to a surface or structure to be used for mounting. These may include, illustratively, wires, cables, chain-link and/or wire-framed materials, and the like.

According to aspects of the disclosed subject matter, typically, though not exclusively, a mounting disc will include channel 118 through which a person may insert a retaining plate to an opening 116 in the mounting disc which exposes most of the retaining plate (e.g., at least 95% of the retaining plate being exposed.) In this way, the large percentage of retaining plates are exposed for attaching (magnetically) to a retainer and serves to keep the retaining plate in the mounting disc so that it will not fall out or be pulled out of opening 116. Of course, in alternative embodiments, one or more retaining plates may be incorporated/molded within the mounting disc. In yet another alternative embodiment, instead of using channel 118 to insert a retaining plate 104 to the opening 116, VHB adhesive may be applied to a retaining plate 104 to secure it to a mounting disc. The mounting disc will typically also include one or more attachment clips, e.g., attachment clips 108, that can attach to a thin surface or structure, including those mentioned above.

A magnetic hanging system may also include a plurality of reinforcing tabs. The reinforcing tabs may include corner reinforcing tabs 110 and edge reinforcing tabs 112 (also referred to as non-corner reinforcing tabs). These reinforcing tabs 110 and 112, when folded as described below, provide reinforcement to a securing hole in a to-be-secured article. In some embodiments, the tabs may have an adhesive applied to one side that assist in reinforcing a to-be-hung article with respect to the use of retainers. Advantageously, these reinforcing tabs provide a significant degree of protection for a to-be-hung article, particularly in extreme conditions, such as high winds, especially high wind gusts, that may cause sheering of the retainer from the mounting surface or retaining plate.

Figure 2D:
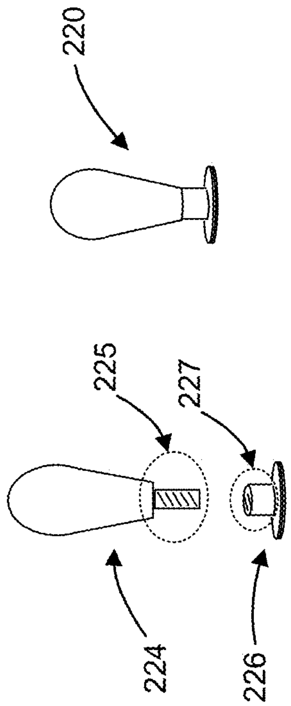
FIGS. 2A-2E illustrate elements of various retainer embodiments suitable for use in a magnetic hanging system, and configured in accordance with aspects of the disclosed subject matter.
Figure 2E:
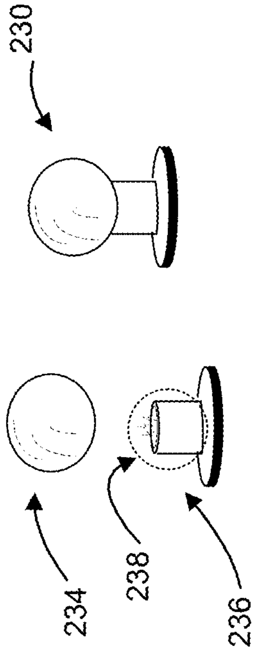
Figure 2A:
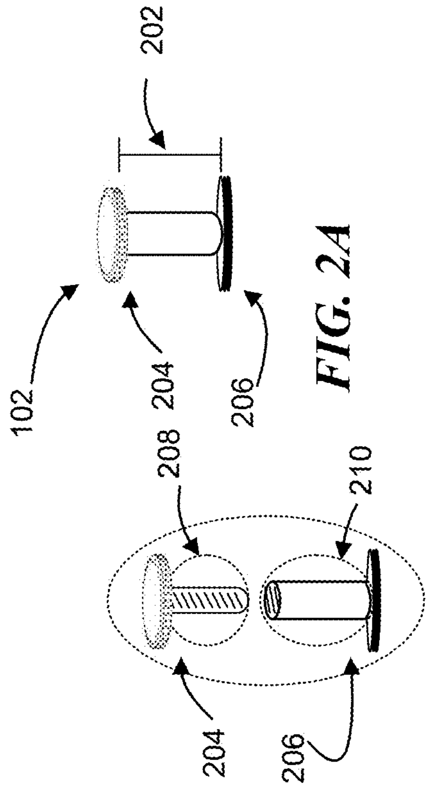

To more fully describe configurations and elements of a retainer, reference is now made to FIGS. 2A-2E. Indeed, these figures illustrate elements of various retainer embodiments suitable for use in a magnetic hanging system, all configured in accordance with aspects of the disclosed subject matter. FIG. 2A illustrates a first configuration of a retainer, e.g. retainer 102. Indeed, as shown in FIG. 2A, retainer 102 comprises both a retaining base 206 and a retaining top 204.

As shown in FIG. 2A, retaining base 206 and retaining top 204 each have a complimentary securing feature, including base securing feature 210 and top securing feature 208. These complimentary securing features, when engaged, create a completed retainer 102 that is sufficient to securely hold a to-be-hung article through a securing hole along a shaft 202 between the retaining top and the retaining base.

As shown in FIG. 2A, the complimentary securing features may comprise a machine threaded screw (in FIG. 2A being the top securing feature 208) and a corresponding, complimentary threaded channel (in FIG. 2A being the bottom securing feature 210) that may be manually screwed together through a securing hole in a to-be-hung article. Of course, in various alternative embodiments, the machine threaded screw may be incorporated within the base securing feature and the corresponding threaded channel incorporated as part of the top securing feature. Additionally and/or alternatively, other mechanical devices may be used to secure the retaining post to the retaining base, such as, illustratively and without limitation, a spring loaded channel into which a post is inserted and twisted to engage lugs within the channel that secure the two together until a person reverses the process.

Figure 2C:
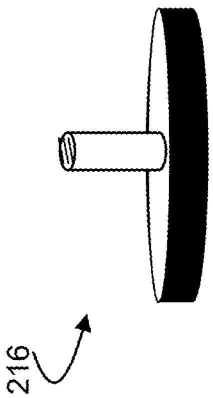
Figure 2B:
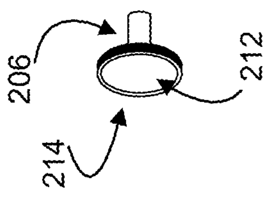

FIG. 2B illustrates a configuration of retaining base 206. According to aspects of the disclosed subject matter, a retaining base will have a base attachment surface 214 that includes/incorporates a base magnet 212 that attracts and secures to a ferromagnetic item, such as a retaining plate or a ferromagnetic mounting surface (e.g., a garage door, wrought iron rail, an iron or steel plate or beam, and the like.) In various embodiments of the disclosed subject matter, the base magnet will have a rating of at least N35. According to actual embodiments, the base magnet is a neodymium disc magnet having a rating of N52.

According to aspects of the disclosed subject matter, the attaching surface 214 of the retaining base 206 typically, though not exclusively, has a diameter of 1 inch. However, as shown in FIG. 2C, in various embodiments a retaining base, such as retaining base 216 may be configured in any number of different diameters and/or sizes. Indeed, suitable but non-limiting diameters of a retaining base range from ½ inches to 2 inches in diameter. Indeed, to include base magnets that provide greater sheer resistance, larger magnets (in surface area) may need to be used. Similarly, the thickness of a given retaining base is often determined by the dimensions of the base magnet that is enclosed therein. Illustratively, while retaining base 206 may have a base thickness of ¼ inches, retaining base 216 may have a base thickness (due to the incorporated base magnet) of ½ inches.

Additionally, while FIGS. 2A-2D illustrate various configurations of retainers all having a rounded (or at least elliptical) retaining bases, such as retaining bases 206 and 216, this should not be viewed as limiting upon the disclosed subject matter. In alternative embodiments, the attaching surface of a retaining base may be configured, without limitation, as a square, rectangle, ovoid, hexagon, or the like.

An alternative retainer configuration is set forth in FIG. 2D, illustrating retainer 220. Retainer 220 includes both a retaining base 226 and a retaining top 224, each with a securing feature, including base securing feature 227 and top securing feature 225. As with retainer 102, these securing features represent a mechanical securing feature (a male threaded screw screwing into a female threaded channel.) Of course, just as with retainer 102, in an alternative embodiment the securing features of retainer 220 may be reverse with the top securing feature having the threaded screw and the base securing feature having the threaded channel.

Turning now to FIG. 2D, this figure illustrates yet another retainer configuration, retainer 230. With respect to retainer 230, as with the other retainers illustrated, the retainer is comprised of a retaining base 236 and a retainer top 234. Only one securing feature is called out in FIG. 2E: the base securing feature 238. In this embodiment, base securing feature 238 includes a strong magnet, e.g., an N35 or greater neodymium magnet, that attaches and secures to the retaining top 234. As far as a top securing feature for retainer 230, if the retaining top consists of ferromagnetic material, anywhere that the retaining top is placed proximate to the base securing feature 238 becomes the top securing feature.

As can be seen in FIGS. 2A-2E, a base securing feature may contribute to the length of a shaft portion of a retainer, as called out with respect to retainer 102. Similarly, depending on the configuration of the securing features, a top securing feature may also contribute to a shaft portion 202 of a retainer. While a securing hole of a to-be-hung article may be able to slide (to some degree) up and down the shaft portion, the outside width/diameter of the retaining base (at least that portion that includes the magnet) is larger than the securing hole of the to-be-hung article, such that the article cannot pass over the securing base. Similarly, the securing top (at its widest point) is designed to be of sufficient outside diameter to prevent the securing hole of the to-be-hung article from passing over it. In short, the securing hole of an article may be able to slide up and down over at least some the shaft portion 202 of a retainer, but the article's securing hole cannot escape the retaining base/retaining top combination when the two are combined.

It should be appreciated that, in various embodiments of the disclosed subject matter, a given set of retainers may be sized (outside diameter) according to the size (inside diameter) of securing hole that a to-be-article may have, such that the outside diameter of both the securing top and securing base is larger than the inside diameter of a securing hole. For example, for a to-be-hung banner having securing holes of ⅜ inches in inside diameter, a set of retainers having a top portion having an outside diameter of at ½ inches (or greater) may be used.

Figure 3A:
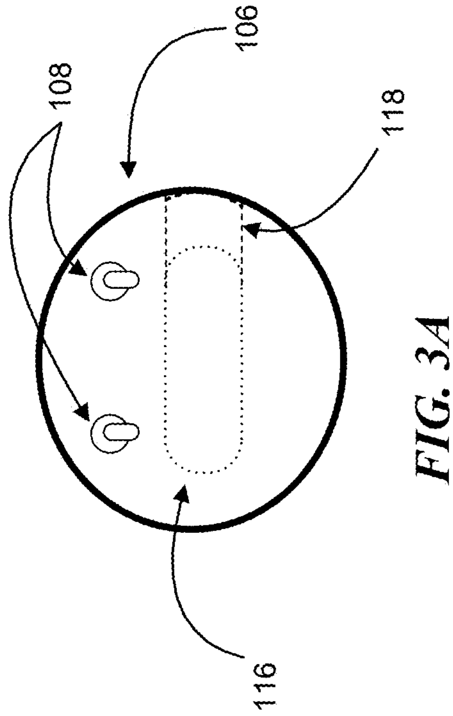
FIGS. 3A-3C illustrates various mounting disc configurations, all configured in accordance with aspects of the disclosed subject matter.
Figure 3B:
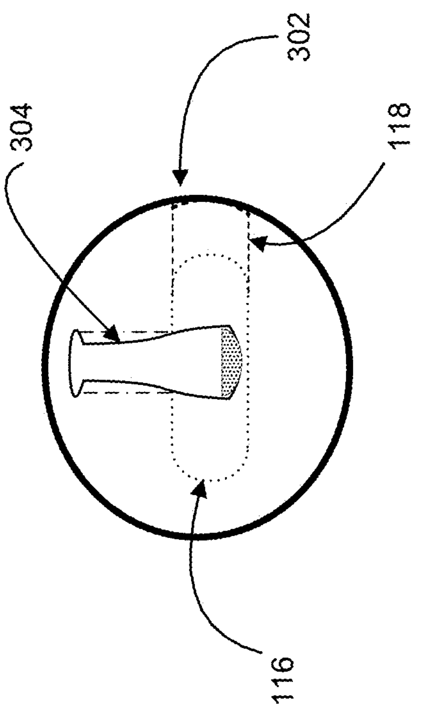
Figure 3C:
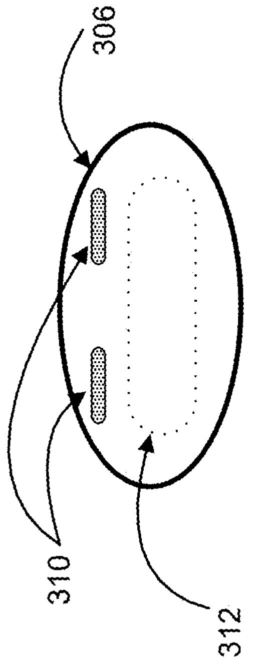

Turning now to FIGS. 3A-3C, these figures illustrate various configurations and/or embodiments of a mounting disc, formed in accordance with aspects of the disclosed subject matter. FIG. 3A illustrates the "back side" of mounting disc 106 (with the front side illustrated in FIG. 1), and particularly displays two exemplary attachment clips 108 that may be used to attach the mounting disc to mounting structures and surfaces such as wire, cable, rope, the top of thin surfaces and/or structures, and the like. Also illustrated with respect to mounting disc 106 is an insertion channel 118 leading to a retaining plate opening 116 formed within the mounting disc.

In contrast to mounting disc 106, mounting disc 302 also shows the "back side" of the mounting disc, and displays that the mounting disc includes a single, though much larger, mounting clip 304 incorporated into the disc. In various embodiments, mounting clip 304 may be configured to pivot relative to the mounting disc to facilitate attachment to a mounting surface or structure that may not align with a desired orientation of the mounting plate 116 to which a retainer may be attached to secure a to-be-hung article. Indeed, clips, such as clip 304, are particularly suitable and advantageous for mounting on thin mounting surfaces and structures, which may be positioned at an angle other than a desired angle for hanging an article. As with mounting disc 106, mounting disc 302 may include channel 118 that leads to the retaining plate open area 116 (on the "front side" of the mounting disc) for inserting a retaining plate.

Yet another configuration, FIG. 3C illustrates the "front side" of mounting disc 306. In this embodiment and configuration, the mounting disc 306 includes two cut outs 310, which pass through the disc, for hosting attachable and positionable clips. Advantageously, cut outs 310 allow for clips, such as clips 108 or clip 304 to be adjustably positioned and oriented for mounting on a structure or surface and then secured (with a securing screw or other feature) with respect to the mounting disc 306. Instead of having a channel (compare to mounting disc 106 and it's channel 118) through which a retaining plate is inserted within the disc and positioned with respect to retaining plate opening 116, mounting disc 306 includes a retaining plate opening 312 into which a retaining plate may be inserted and secured (secured typically using an adhesive applied to the back of the inserted retaining plate.)

According to aspects of the disclosed subject matter, any given mounting disc, such as mounting disc 106, may consist of or comprise any of a variety of polymer materials, ceramics, metal plates, and the like. Typically, though not exclusively, a mounting disc will consist of a polymer material with just enough flexibility to allow a retaining plate (as will discussed below with respect to FIG. 4) to be inserted through the channel 118, with said retaining plate having raised lip around an entire surface of the retaining plate. Additionally, in embodiments of the disclosed subject matter, mounting discs may be configured to a variety of shapes, including circular shapes such as mounting disc 106, elliptical shapes such as mounting disc 306, rectangular or square shapes (not shown), and others.

Additionally, and without limitation, a circular mounting disc may have a diameter of between 2½ inches and 4 inches. As indicated earlier, at least one retaining plate may be inserted into, or is incorporated within, a mounting disc in a mounting disc opening. Additionally and/or alternatively, in other embodiments, a mounting disc may include openings for incorporating multiple retaining plates.

Figure 4A:
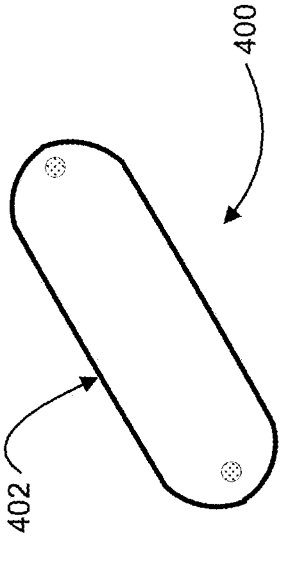
FIGS. 4A-4B illustrate exemplary retainer plates with a rim to further secure retainers to the retaining plates according to aspects of the disclosed subject matter.

Turning to FIG. 4A, and according to aspects of the disclosed subject matter, this figure illustrates an exemplary retaining plate 400 having a raised rim 402 around the edge of one surface. In this embodiment, typically though not exclusively, the height of the raised rim may be 1 mm or more, though in many instances a raised rim of 1 mm is sufficient. The height of the raised rim may be less in various embodiments, e.g., 0.5 mm, dependent on any rounding on the edges of an attachment surface of the retaining base, which rounding may enable the retaining base to be more easily sheered from the retaining plate. Similarly, the raised rim only needs to have a thickness sufficient to prevent the lateral sheering of a retainer from a retaining plate. When the raised rim is a part of the ferromagnetic material of the retaining plate, a thinner raised rim, e.g., 0.5 mm, is all that may be needed.

Figure 4B:
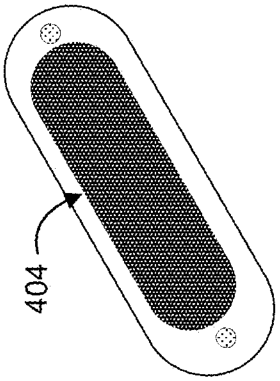

FIG. 4B illustrates the opposite side of retaining plate 400. In this example, an adhesive tab 404 has been applied to the "back" surface of the retaining plate. As indicated above with respect to mounting disc 306, the use of an adhesive, such as adhesive tab 404 allows the placement of the retaining plate into a retaining plate opening, such as retaining plate opening 312, without the use of an insertion channel 118. Alternatively, and as discussed above, the application of an adhesive to a retaining plate permits the direct mounting of a retaining plate to nearly any surface. As shown in FIG. 4B, in various embodiments of the disclosed subject matter, the adhesive tab will have dimensions similar to, but slightly smaller than the retaining plate to accommodate alignment issues that may occur when a person applies the adhesive tab. Indeed, suitable adhesive tab dimensions may allow for 1 mm (or more) from a corresponding edge of the retaining plate.

Figure 5:
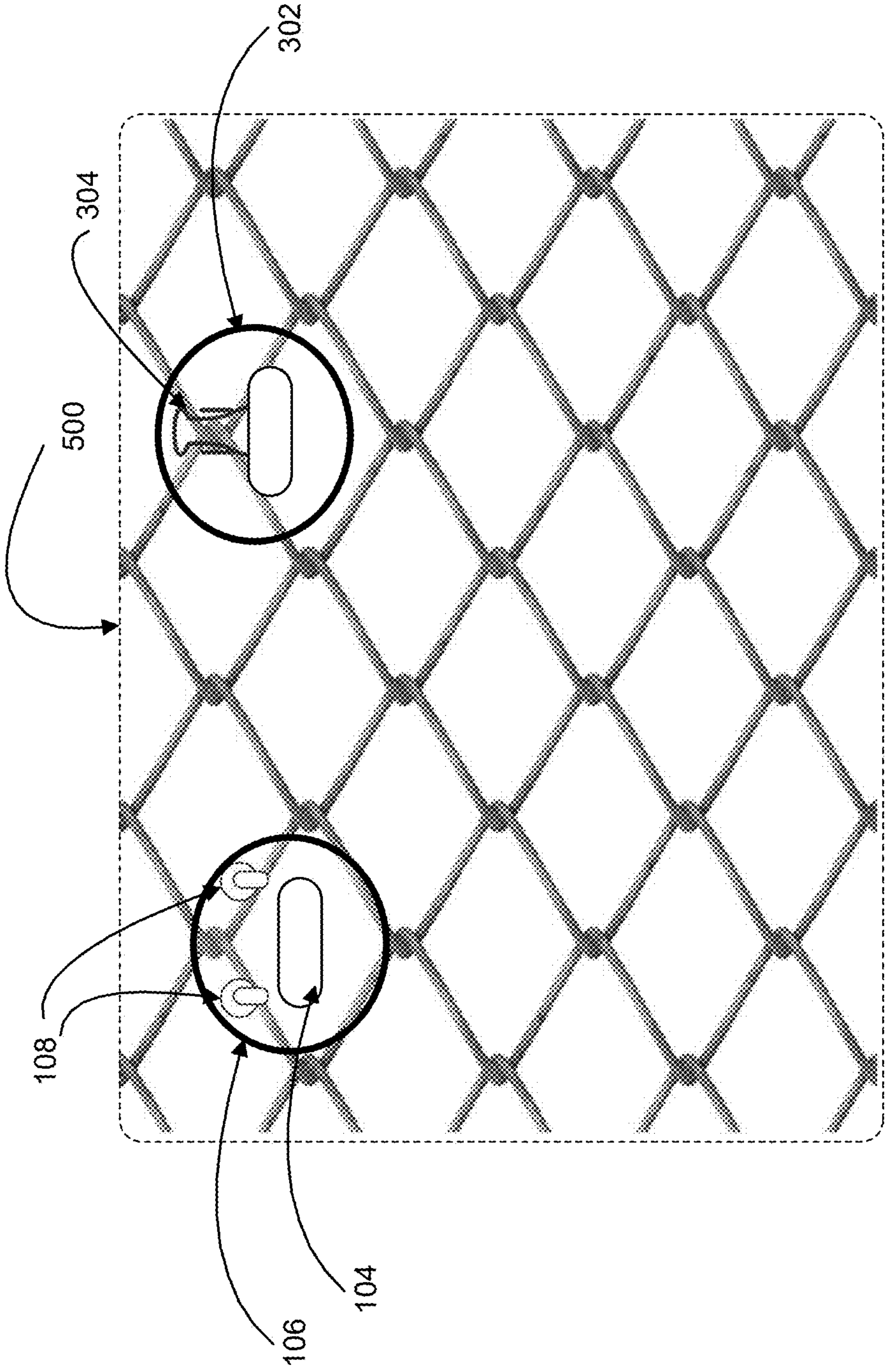
FIG. 5 illustrates an exemplary use of a mounting disc for use in a magnetic hanging system, in accordance with aspects of the disclosed subject matter.

FIG. 5 is an illustration of mounting discs, including mounting disc 106 and mounting disc 302, attached (via attachment clips 108) to a chain-link fence 500. This demonstrates circumstances in which mounting discs would be advantageous to use. As can be seen, both types of mounting clips, including mounting clips 208 and mounting clip 304, may be advantageously used in this instance.

Figure 6:
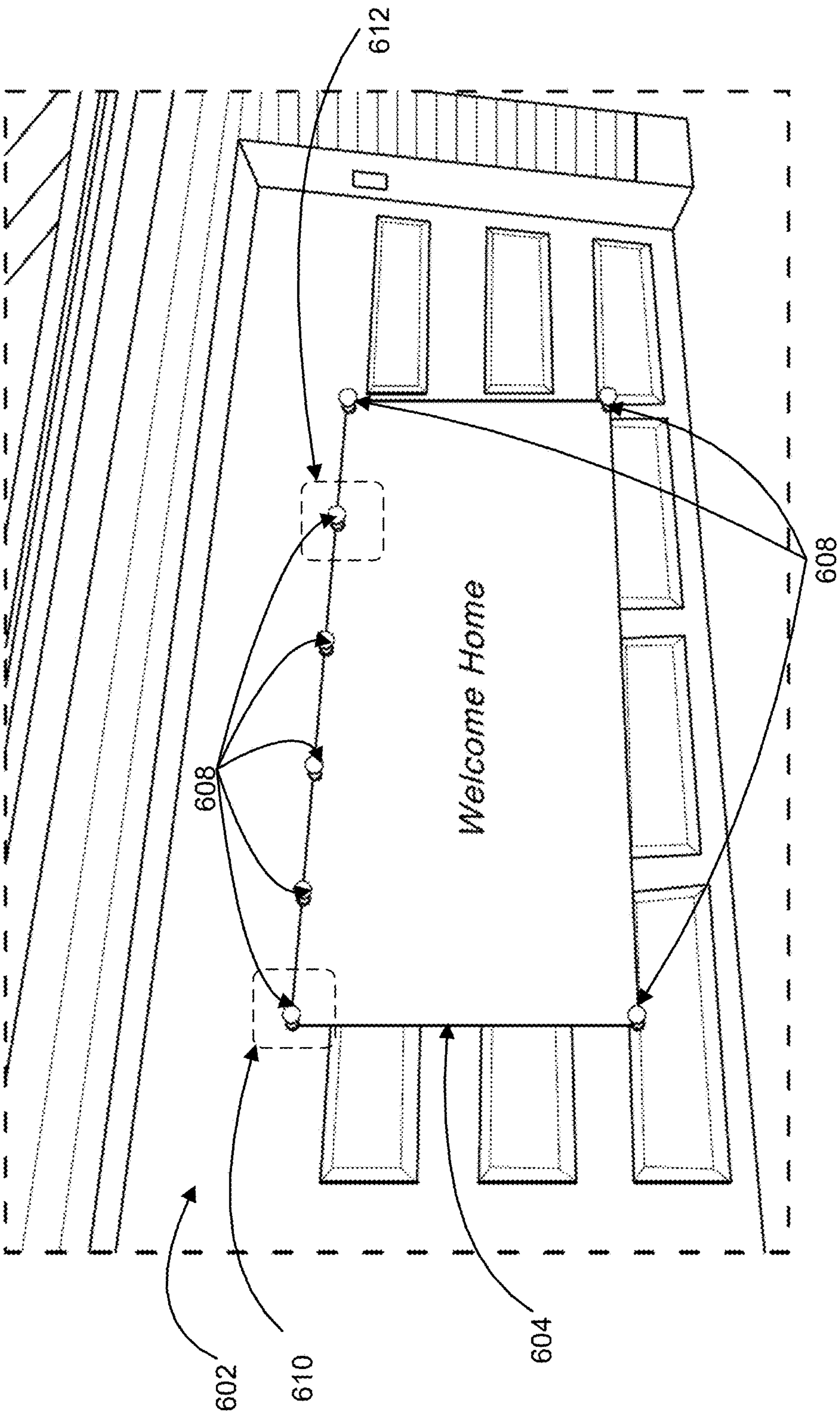
FIG. 6 illustrates an exemplary magnetic mounting system hanging an article, configured in accordance with aspects of the disclosed subject.

Turning now to FIG. 6, this figure illustrates an exemplary use of a magnetic hanging system formed in accordance with aspects of the disclosed subject matter. More particularly, in this exemplary illustration, a banner 604 is suspended on a garage door 602 using a magnetic hanging system comprising (illustratively) eight retainers 608, including six retainers along the top of the banner, and two retainers at each bottom corner of the banner. In the instance that the garage door is not ferromagnetic, each retainer would magnetically attach to a corresponding retaining plate that is, at least temporarily, applied to the garage door 602. Of course, in the instance that the garage door is comprised of ferromagnetic material, the magnetic hanging system would not be required to use a corresponding number of retaining plates per retainers. Advantageously, through the use of the magnetic hanging system, the hung banner 608 may be a permanent or a long-term positioned banner or, alternatively, a temporarily hung banner that can be easily and quickly detached. Advantageously, irrespective of whether the garage door is ferromagnetic or not, the banner 604 may be readily hung in dry or wet weather.

Also illustrated in FIG. 6 are areas 610 and 612. According to aspects of the disclosed subject matter, a securing hole in area 610, being located in a corner of the banner, may also be illustratively reinforced using one or more reinforcing tabs, such as a corner reinforcing tab 110 or at least one edge reinforcing tab 112, as will be described with respect to FIGS. 7A-7D. In contrast, the securing hole in area 612 is not on a corner of the banner and may be illustratively reinforced using an edge reinforcing tab 112, as will be described below in regard to FIGS. 8A- 8C.

Figure 7D:
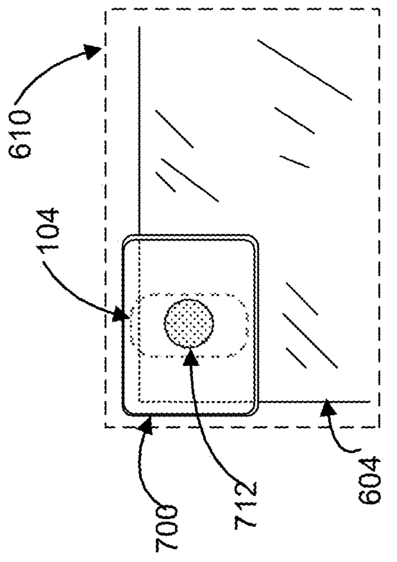
FIGS. 7A-7D illustrate corner reinforcing tabs for use in accordance with aspects of the disclosed subject.
Figure 7C:
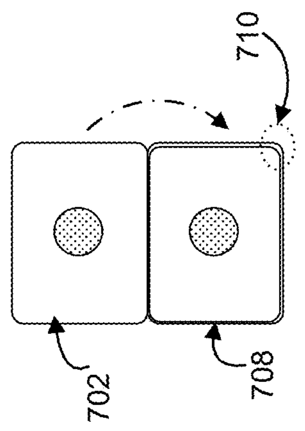
Figure 7A:
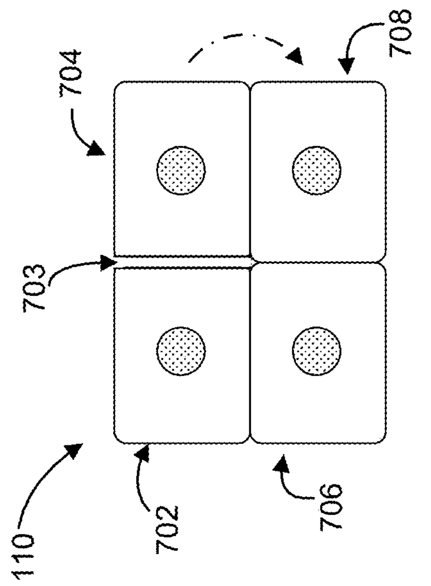
Figure 7B:
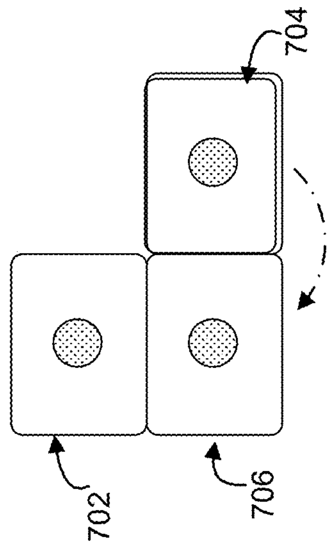

Turning now to FIGS. 7A-7C, these figures illustrate the use of a corner reinforcing tab 110 in hanging an article, such as reinforcing a corner of the banner in FIG. 6, in accordance with aspects of the disclosed subject matter. Shown in FIG. 7A is an unfolded corner reinforcing tab 110 that, when folded correctly, provides support for an article on the two outside edges of the article. The corner reinforcing tab includes four tabs, tabs 702-708, each having in their center, a hole such that, when the reinforcing tab 110 is completely folded, each center hole aligns with the other center holes and can be placed over a securing hole in the to-be-hung article. The alignment of center holes permits a retainer, such as retainer 102 of FIG. 1, to pass through the aligned center holes, the article's securing hole, and retain at least a portion of the article for attaching to a mounting surface or retaining plate 104.

As shown in FIG. 7A, corner reinforcing tab 110 has a cut, cut 703, between tab 702 and 704 which permits its novel folding in accordance with aspects of the disclosed subject matter. To begin this novel folding and with the un-folded reinforcing tab oriented a displayed in FIG. 7A, tab 704 is folded down (as indicated by the dashed arrow) over tab 708, resulting in the configuration displayed in FIG. 7B. With reference to FIG. 7B, the two stacked tabs, tabs 704 and 708, are then jointly folded over tab 706, as indicated by the dashed arrow in FIG. 7B, resulting in the configuration being disclosed in FIG. 7C.

In FIG. 7C, tab 702 is folded over the "stack" of tabs, as indicated by the dashed arrow, resulting with tab 708 on top of the stack (as shown), with tab 704 directly below tab 708, and tab 706 on the bottom the stack. A final fold results in the stacked tabs 700 configuration displayed in area 610 from FIG. 6. Moreover, the corner of the banner is inserted into the stacked tabs 700 between tabs 704 and 708, which then provide two unopen edges as support for the article. As shown in FIG. 7D, the holes in the stacked tabs align with the securing hole 712 in the banner 604, and the alignment leads to the retaining plate to which a retainer magnetically attaches after being assembled through the various holes.

Figure 8B:
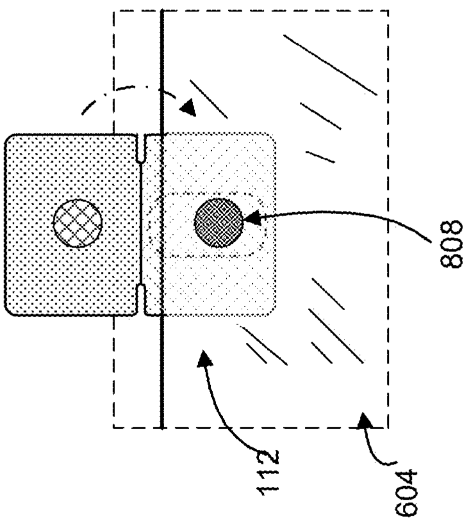
FIGS. 8A-8C illustrate an exemplary single-edge folding tab as applied to an article for hanging, in accordance with aspects of the disclosed subject matter.
Figure 8A:
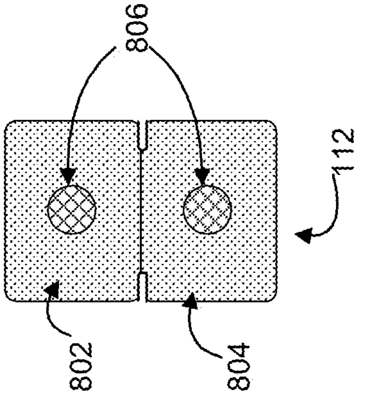
Figure 8C:
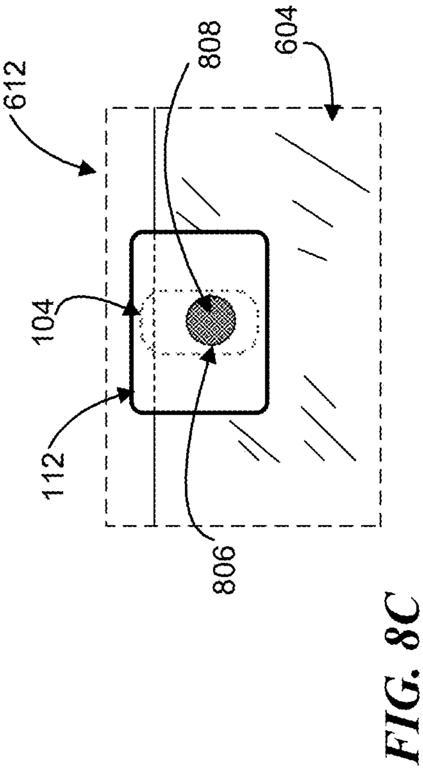

Turning to FIGS. 8A-8C, these figures illustrate an exemplary edge reinforcing tab 112 as applied to an article for hanging, all in accordance with aspects of the disclosed subject matter. As shown in FIG. 8A, the edge reinforcing tab 112 includes two individual tabs, tabs 802 and 804, with a center hole 806 in each tab. As will be seen, when edge reinforcing tab 112 is folded, the center holes 806 of each tab align and can be positioned with respect to a securing hole in a to-be-hung article.

According to one or more aspects of the disclosed subject matter, an edge reinforcing tab 112 may have an adhesive applied to the tabs 802 and 804 on one side. Advantageously, this adhesive serves to reinforce the to-be-hung article and is especially useful when there is potential for pulling or sagging on the article which could affect the securing holes, causing a rip.

To apply the edge reinforcing tab in a configuration without the adhesive, the "top" tab 802 is folded over an edge of the to-be-hung article, such as banner 604, the center holes 806 are aligned with a securing hole in the article, and a retaining top and retaining bottom are secured through the aligned holes.

In contrast, when using an edge reinforcing tab 112 that has adhesive applied to one side, and in reference to FIG. 8B, the sticky side of a "bottom" tab is aligned with the securing hole in the article, and the tab is pressed against the article. Subsequently, the "top" tab 802 is folded down over the article and pressed to the article. Assuming that the reinforcing hole 806 of the bottom tab is aligned with the securing hold 808, the reinforcing hole of the top tab will also align. The end result is illustrated as area 612 of FIG. 6 and further shows how the reinforced edge is then positioned over a retaining plate 104.

While the above description is largely made with respect to multiple retainers to hang an article, and the typical use of retaining plates being secured in areas for attaching a retainer, it will be appreciated that in many instances, no retaining plates are needed. As described above with respect to FIG. 6, to hang banner 604 on a garage door, where the garage door is comprised of ferromagnetic material, no retaining plate is needed as part of the magnetic hanging system. Indeed, there is no need for a 1:1 correspondence between retainers and retaining plates needed to hang an article. Further, in various embodiments of the disclosed subject matter, only a single retainer is needed to hang an article (which may or may not require a retaining plate).

The invention claimed is:

1. A magnetic hanging system, comprising at least:

a plurality of retainers;

one or more retaining plates;

wherein each retainer of the plurality of retainers comprises, at least, a retaining base and a retaining top; and one or more mounting discs, wherein a first mounting disc includes at least one attaching clip on a back surface of the first mounting disc, and further includes a retaining plate opening into which a retaining plate of the one or more retaining plates can be inserted;

wherein each retaining base comprises a base attachment surface that includes a base magnet that attaches and secures to ferromagnetic material, and wherein each retaining base further comprises a base securing feature used to secure the retaining base to the retaining top;

wherein the retaining top includes a top portion and a top securing feature; and wherein the retainer, upon securing the top securing feature to the base securing feature through a securing hole in an article, is configured to retain at least a portion of the article for hanging;

wherein each retaining plate of the one or more retaining plates comprises ferromagnetic material;

wherein at least one retainer of the plurality of retainers is magnetically attached to a first retaining plate, of the one or more retaining plates; and wherein the first retaining plate is affixed to a mounting surface for hanging the article.

2. The magnetic hanging system of claim 1 wherein the base securing feature is mechanically secured to the top securing feature.

3. The magnetic hanging system of claim 2:

wherein the base securing feature comprises one of a male threaded post or a female threaded channel, and the top securing feature comprises the other of the male threaded post or the female threaded channel; and wherein the base securing feature and the top securing feature are mechanically secured by being screwed together.

4. The magnetic hanging system of claim 3, wherein the retaining top is flanged, and wherein the top securing feature is a male threaded post.

5. The magnetic hanging system of claim 4, wherein the base securing feature is a female threaded channel.

6. The magnetic hanging system of claim 1, wherein the base attachment surface of the retaining base is sufficient in area to be unable to pass through the securing hole in the article.

7. The magnetic hanging system of claim 6, wherein the retaining base is circular and has an outside diameter greater than the diameter of the securing hole of the article.

8. The magnetic hanging system of claim 7, wherein the outside diameter of the magnetic retaining surface is at least one inch.

9. The magnetic hanging system of claim 1, wherein the base magnet is a neodymium magnet to securely attach the retainer to ferromagnetic material.

10. The magnetic hanging system of claim 1, wherein the base magnet has an N35 rating or higher.

11. The magnetic hanging system of claim 1, wherein the surface area of the retaining top is greater than the area of the securing hole of the article such that the retaining top is unable to pass through the securing hole.

12. The magnetic hanging system of claim 1, wherein the retaining top is circular and has a diameter of at least ⅝ of an inch.

13. The magnetic hanging system of claim 1, wherein the first retaining plate is 30 mm wide, 60 mm long, and 1 mm thick.

14. The magnetic hanging system of claim 13, wherein the first retaining plate has rounded ends having a radius of 15 mm.

15. The magnetic hanging system of claim 1, wherein each retaining plate of the one or more retaining plates has a ridge on the entire outside edge of one surface of the one or more mounting plates.

16. The magnetic hanging system of claim 15, wherein ridge on the entire outside edge of one surface of the one or more mounting plates is 1 mm high from the one surface of the mounting plate and is 0.5 mm wide.

17. The magnetic hanging system of claim 1, wherein the at least one of the one or more retaining plates is mounted to the mounting surface using a vinyl acrylic foam (VAF) adhesive tape that conforms and adheres to the mounting surface.

* * * * *